United States Patent [19]

Niwa et al.

[11] Patent Number: 5,688,728

[45] Date of Patent: Nov. 18, 1997

[54] POROUS CERAMIC MATERIAL

[75] Inventors: Tomonori Niwa; Yusuke Makino, both of Aichi, Japan

[73] Assignee: NGK Spark Plug Co., Ltd., Nagoya, Japan

[21] Appl. No.: 557,840

[22] Filed: Nov. 14, 1995

[30] Foreign Application Priority Data

Nov. 16, 1994 [JP] Japan ................... 6-308294

[51] Int. Cl.$^6$ .................................. C04B 38/08
[52] U.S. Cl. .................. 501/80; 501/88; 501/98; 501/105; 501/128
[58] Field of Search .................. 501/80, 88, 128, 501/98, 105

[56] References Cited

U.S. PATENT DOCUMENTS

| | | | |
|---|---|---|---|
| 3,888,691 | 6/1975 | Villani et al. | 501/80 |
| 4,572,848 | 2/1986 | Pollak et al. | 427/294 |
| 4,629,707 | 12/1986 | Wolfe | 501/97 |
| 4,650,592 | 3/1987 | Dobbs et al. | 501/97 |
| 4,687,752 | 8/1987 | Peters | 501/128 |
| 4,769,348 | 9/1988 | O'Holleran | 501/80 |
| 4,932,438 | 6/1990 | Kitamura et al. | 137/625.17 |
| 5,080,378 | 1/1992 | Kagawa | 501/88 |
| 5,114,886 | 5/1992 | Tsukada | 501/88 |
| 5,196,384 | 3/1993 | Kamezaki et al. | 501/80 |
| 5,252,526 | 10/1993 | Whittmore | 501/80 |
| 5,377,713 | 1/1995 | Friederich et al. | 137/1 |
| 5,441,799 | 8/1995 | Owens et al. | 501/88 |

FOREIGN PATENT DOCUMENTS

| | | |
|---|---|---|
| 0 215 132 | 3/1987 | European Pat. Off. . |
| 6-032646 | 2/1994 | Japan . |
| 6-058434 | 3/1994 | Japan . |
| WO 92/16778 | 10/1992 | WIPO . |

OTHER PUBLICATIONS

Database WPI Section CH, Week 9021, Derwent Publications Ltd., AN 90-160369 (1990).

Chemical Abstracts, vol. 113, No. 16, abstract No. 13739y, Feb. 1990.

Patent Abstracts of Japan, vol. 018, No. 400, abstract C-1230 (Apr. 1994).

Database WPI week 9421, Derwent Publications Ltd., AN 94-173575, Apr. 1994.

*Primary Examiner*—Karl Group
*Attorney, Agent, or Firm*—Foley & Lardner

[57] ABSTRACT

A porous ceramic material for a slidable member on unit such as a valve unit of a combination faucet. The porous ceramic material comprises a ceramic sintered body which is formed with pores dispersedly located therein. The pores are defined respectively by surface layers forming part of the ceramic sintered body. Each surface layer contains silicon in a content higher than that in other part of the ceramic sintered body. The porous ceramic material is prepared, for example, first by mixing ceramic powder and hollow particles each of which contains silicon so as to obtain a mixture; then by forming the mixture into a predetermined shape to obtain a formed body; and finally by sintering the formed body at a temperature higher than a melting point of each hollow particle to thus obtain the sintered body formed with pores and containing silicon.

6 Claims, 6 Drawing Sheets

POROUS CERAMIC MATERIAL

BACKGROUND OF THE INVENTION

1. Field of the Invention

This invention relates to improvements in a porous ceramic material and a method of producing the porous ceramic material, and a valve unit including a slidable member formed of the porous ceramic material, in which the porous ceramic material is high in durability under thermal shock and thermal stress while maintaining a high sliding characteristics even upon a long time use.

2. Description of the Prior Art

Hitherto a variety of methods have been proposed and put into practical use in order to improve a sliding characteristics of a slidable member, for example, of a valve of a combination faucet (for hot water and cool water)or of a mechanical seal ring. One of the methods is to form the slidable member of a material which is prepared by impregnating a porous ceramic material having a three-dimensional network structure, with lubricating oil. Another one is to select the smoothness of the sliding surface of a slidable member formed of a porous ceramic material, to fall below a predetermined value as disclosed in Japanese Patent Provisional Publication No. 6-58434. A further one is to select the surface roughness of the sliding surface of a slidable member formed of a porous ceramic material, to fall within a predetermined range as disclosed in Japanese Patent Provisional Publication No. 6-32646. According to the above methods, the sliding characteristics of the slidable member can be improved under the action of the lubricating oil to be exuded to a sliding surface, or under the action of pores located at and open to the sliding surface. In general, such a porous ceramic material is produced as follows: First, resin particles formed of a synthetic resin such as epoxy resin, phenolic resin or acrylic resin are mixed in ceramic powder to prepare a mixture. The mixture is then formed into a predetermined shape by using a metallic mold press or the like thereby to form a formed body in which resin particles are dispersed. Finally, the formed body is sintered to form the porous ceramic material. During this sintering, the resin particles in the formed body is burnt or decomposed to be extinguished so that pores are formed in the ceramic material.

However, such a porous ceramic material has a tendency to be not always high in thermal shock resistance as compared with a ceramic material formed with no pores even though it is improved in sliding characteristics.

SUMMARY OF THE INVENTION

It is an object of the present invention to provide an improved porous ceramic material which can overcome drawbacks encountered in conventional porous ceramic materials.

Another object of the present invention is to provide an improved porous ceramic material which is suitable to be used as a slidable member or the like and is high in thermal shock resistance as compared with the conventional porous ceramic materials.

A further object of the present invention is to provide an improved porous ceramic material producing method which makes possible to form a porous ceramic material which is thermal shock resistance, without raising a production cost and without using troublesome operations.

A still further object of the present invention is to provide an improved valve unit formed of a porous ceramic material which is high in durability under thermal shock and thermal stress while maintaining a good sliding characteristics even upon a long time use.

A first aspect of the present invention resides in a porous ceramic material comprising: a ceramic sintered body which is formed with pores dispersedly located in the sintered body, the pores being defined respectively by surface layers forming part of the ceramic sintered body; and silicon contained in the ceramic sintered body, a content of silicon being higher in at least a part of the surface layers than that in other part of the ceramic sintered body.

According to this aspect, the porous ceramic material is not only excellent in sliding characteristics but also sufficiently high in thermal shock resistance.

A second aspect of the present invention resides in a method of producing a porous ceramic material, comprising the following steps in the sequence set forth: (a) mixing ceramic powder and hollow particles each of which contains silicon so as to obtain a mixture; (b) forming the mixture into a predetermined shape to obtain a formed body; and (c) sintering the formed body at a temperature higher than a melting point of each hollow particle to obtain a sintered body formed with pores and containing silicon.

A third aspect of the present invention resides in a porous ceramic material comprising: a ceramic sintered body which is formed with pores dispersedly located in the sintered body, the pores being defined respectively by surface layers forming part of the ceramic sintered body; and silicon contained in the ceramic sintered body, a content of silicon being higher in at least a part of the surface layers than that in other part of the ceramic sintered body. The porous ceramic material is produced by a method including the following steps in the sequence set forth: (a) mixing ceramic powder and hollow particles each of which contains silicon so as to obtain a mixture; (b) forming the mixture into a predetermined shape to obtain a formed body; and (c) sintering the formed body at a temperature higher than a melting point of each hollow particle to obtain the ceramic sintered body formed with pores and containing silicon.

A fourth aspect of the present invention resides in a slidable member formed of a porous ceramic material including a ceramic sintered body which is formed with pores dispersedly located in the sintered body, the pores being defined respectively by surface layers forming part of the ceramic sintered body, and silicon contained in the ceramic sintered body, a content of silicon being higher in at least a part of the surface layers than that in other part of the ceramic sintered body. The slidable member comprises a main body, and means defining a sliding surface at a part of the main body, the sliding surface being in slidable contact with a member independent from the main body.

A fifth aspect of the present invention resides in a valve unit comprising: a liquid supply-side member including at least one liquid supply means through which liquid is supplied into the valve unit, and having a first sliding surface; a flow amount control member having a second sliding surface which is in slidable contact with the first sliding surface of the supply-side member, the flow amount control member being relatively rotatable to the liquid supply-side member so as to control an amount of the liquid to be supplied from the supply-side member; and liquid discharge means through which the liquid controlled in the amount is discharged from the valve unit, the liquid discharge means being formed at least one of the supply-side member and the flow amount control member. Each of the supply-side member and the flow amount control member is formed of a porous ceramic material including a ceramic sintered body which is formed with pores dispersedly located in the sintered body, the pores being defined respectively by surface layers forming part of the ceramic sintered body, and silicon contained in the ceramic sintered body, a content of silicon being higher in at least a part of the surface layers than that in other part of the ceramic sintered body.

According to the fifth aspect, component parts of the valve unit are formed of the porous ceramic material of the present invention and therefore they are sufficiently high in durability under thermal shock and thermal stress while maintaining a good sliding characteristics therebetween even upon a long time use.

DETAILED DESCRIPTION OF THE INVENTION

According to the present invention, the porous ceramic material comprising: a ceramic sintered body which is formed with pores dispersedly located in the sintered body, the pores being defined respectively by surface layers forming part of the ceramic sintered body; and silicon contained in the ceramic sintered body, a content of silicon being higher in at least a part of the surface layers than that in other part of the ceramic sintered body. The porous ceramic material is produced, for example, by a producing method comprising the following steps in the sequence set forth: (a) mixing ceramic powder and hollow particles each of which contains silicon so as to obtain a mixture; (b) forming the mixture into a predetermined shape to obtain a formed body; and (c) sintering the formed body at a temperature higher than a melting point of each hollow particle to obtain the ceramic sintered body formed with pores and containing silicon.

The porous ceramic material of the present invention comprises the ceramic sintered body. A main raw material (ceramic powder) of the ceramic sintered body is, for example, $Al_2O_3$ system powder, $Si_3N_4$ system powder, SiC system powder, AlN system powder, $ZrO_2$ powder and/or the like. Accordingly, the sintered body obtained by the above production method has component particles which are generally the same in composition and crystal structure as the above powder of the main raw material. The ceramic sintered body has many pores which are dispersedly located therein, in which each pore is defined by the surface of a surface layer forming part of a solid section of the sintered body. Each of almost all the pores is surrounded with the surface layer so that the surface of the surface layer defines a pore. The pores may be continuous to each other to form a long hole in the ceramic sintered body. The surface layer is higher in Si (silicon) content than other part of the solid section of the sintered body. By virtue of this feature, the porous ceramic material of the ceramic sintered body becomes particularly suitable for a slidable member having a sliding surface which is in slidable contact with another member. In will be understood that a surface portion having the above sliding surface is formed with the pores, in which some pores open to the sliding surface. Accordingly, for example, in case that a lubricant such as a lubricating oil is supplied to the sliding surface, the lubricant is retained in the open pores and exudes little by little, and therefore it is possible to maintain a lubricating effect for a long time while improving a sliding characteristics of the slidable member. Even if in case that the lubricant is not supplied, an adhesion or linking phenomena caused between the slidably contacting surfaces when the smoothness of the contacting surfaces is very high can be suppressed owing to existence of the open pores at the sliding surface thus similarly improving the sliding characteristics of the slidable member. Additionally, the layer high in Si content is formed surrounding each pore, and therefore the resultant porous ceramic material is high in thermal shock resistance similarly to a ceramic material which is not formed with pores.

An average size or diameter of each pore formed in the ceramic sintered body is larger than that of the main component particles (or the raw material ceramic powder) of the ceramic sintered body in order that the porous ceramic material has a suitable retaining ability for the lubricant and a suitable linking suppressing effect while securely obtaining a sealing ability between the contacting surfaces and a sufficient strength of the ceramic sintered body itself. The average size of each pore in the ceramic sintered body is preferably within a range of from 5 to 300 μm, more preferably within a range of from 20 to 250 μm, and further more preferably within a range of from 50 to 200 μm. A total volume of the pores formed in the ceramic sintered body is preferably within a range of from 2 to 40% relative to the volume of the ceramic sintered body, more preferably within a range 2 to 20%, and further more preferably within a range of from 3 to 10%.

The pores formed in the ceramic sintered body depend on the hollow particles which are mixed with the raw material ceramic powder and contained in the ceramic sintered body. In this regards, in case that an average particle size or diameter of each of the hollow particles is set within the range of from 20 to 250 μm, the average particle size of the raw material ceramic powder is set preferably within a range of from 1 to 20 μm, more preferably within a range of from 2 to 5 μm, so that the average particle size of the pores formed in the ceramic sintered body becomes larger than that of the component particles of the ceramic sintered body.

During sintering of the formed body including the raw material ceramic powder and the hollow particles, some hollow particles may crush and other hollow particles may maintain their inside space which forms each pore in the ceramic sintered body after completion of the sintering. Each hollow particle is formed of a raw material containing Si (silicon). The raw material of the hollow particles is preferably one which has a melting point lower than a sintering temperature of the raw material ceramic powder, or one which may react with a component of the raw material ceramic powder to form an eutectic crystal or the like which is relatively low in melting point. By using such a raw material for the hollow particles, the surface layer high in Si content can be relatively easily formed around each pore in the ceramic sintered body, i.e., formed at a portion near the surface in contact with the pores. A mechanism for forming such a high Si content layer seems to be that a part of a component of the hollow particle molten during the sintering again precipitates at the surface layer surrounding each pore. It is supposed that the thus precipitated substance at the surface layer fills a gap or the like among particles of the raw material ceramic powder, exposed to the pore. This reinforces a portion which serves as a starting point of breakage of the ceramic sintered body, thereby improving the thermal shock resistance of the porous ceramic material. Another part of the hollow particle component molten during the sintering flows into among the ceramic powders and serves as a kind of sintering assistant, thereby providing an advantage of decreasing the adding amount of sintering assistants to the raw material ceramic powder. The surface layer high in Si content may be formed in a crystalline state or in an amorphous (glass) state.

Each hollow particle is, for example, formed of a material of $SiO_2$ system (containing SiO2 as a main component), $SiO_2$-$Al_2O_3$ system (containing $SiO_2$ and $Al_2O_3$ as main components), or the like. The material of the hollow particle is suitably selected according to the raw material ceramic powder. Either of the materials of the $SiO_2$ system and the $SiO_2$-$Al_2O_3$ system is compatible with the raw material ceramic powder of the $Al_2O_3$, and forms a low melting point reaction product upon reaction with the raw material ceramic powder. A particle size (diameter) of the raw material ceramic powder to be used and a mixing amount (ratio) relative to the amount of the raw material ceramic powder to be used are set in accordance with the average size and the volume percentage of the pores in the ceramic sintered body. The shape of the hollow particles is preferably generally spherical because of providing generally spherical pores which can prevent formation of a portion serving as the starting point of breakage of the ceramic sintered body. In this case, the generally spherical shape means a spherical shape and a shape similar to the spherical shape (for example, a generally an egg-shape, and the shape of ellipsoid of revolution). It will be understood that each hollow particle is not necessarily generally spherical and therefore may be of a shape which does not cause a portion serving as the starting point of breakage of the ceramic sintered body. An example of the spherical hollow particles of the $SiO_2$-$Al_2O_3$ is readily available on the market under the trade name of "SHO BALLOON" of Showa Denko Co., Ltd. Another example of the spherical hollow particles is available under the trade name of "Micro Balloon" of Pacific Chemical Marketing Company.

In case of using the hollow particles (for example, of the $SiO_2$-$Al_2O_3$ system) containing two or more basic components, the hollow particles may be prepared by previously melting and mixing the basic components, or otherwise may be prepared by mixing separate basic components. In such a case, a composition (mixing) ratio between the basic components of the hollow particles are suitably selected so that the hollow particles have a suitable melting temperature. In this regard, in case that the hollow particles to be used is of the $Al_2O_3$-$Al_2O_3$ system, the mixing ratio between $SiO_2$ and $Al_2O_3$ is preferably such that the content of $SiO_2$ relative to total of $SiO_2$ and $Al_2O_3$ is within a range of from 50 to 70% by weight.

In this case, it is preferable that the above porous ceramic material has a thermal shock resistance temperature which is not lower than 80% of that of a ceramic material which is formed with no pore. Here, meant by the term "ceramic material which is formed with no pore" is a material which is prepared by sintering a formed body obtained by a raw material ceramic powder without addition of a pore-forming medium such as the hollow particles. The thermal shock resistance temperature is represented by the following equation:

$$\Delta T = T - T0$$

where $\Delta T$ is the thermal shock resistance temperature; and T is the highest value of a heating temperature at which value no crack is produced in a test piece (having a predetermined shape and dimensions) of the ceramic material even under a thermal shock test which is conducted by locating the test piece upon heating into water having a predetermined temperature T0.

Next, the producing method of the porous ceramic material will be discussed in detail. The producing method comprises the following steps:

(a) A mixing step: The ceramic powder and the hollow particles each containing Si are mixed with each other to obtain a mixture;

(b) A forming step: The above mixture at the mixing step is formed into a predetermined shape to obtain a formed body; and (c) A sintering step: The formed body at the forming step is sintered at a temperature higher than a melting point of each hollow particle to obtain the ceramic sintered body formed with pores and containing Si.

In the mixing step, mixing of the raw material ceramic powder and the hollow particles is accomplished by using a known mixing or agitating machine such as a mixer in a dry method (without using liquid). However, such mixing may be accomplished in a wet method in which the raw material ceramic powder and the hollow particles are mixed together with water, solvent or the like to form a slurry.

In the forming step, the formed body is fabricated by a known manner such as a pressing using a metallic mold, an injection molding, a slip casting, or the like. Here, in case of using the metallic mold pressing, it is preferable to add one of a variety of binders to the raw material ceramic powder in order to increase the strength of the formed body. A pressure during pressing in this case depends on kind and particle distribution and the like of the raw material ceramic powder and the hollow particles, in which the pressure is regulated within a range in which the resultant formed body has a suitable strength while preventing the hollow particles from being crushed or damaged during fabrication or formation under the pressure. For example, in case that the hollow particles of the $SiO_2$-$Al_2O_3$ system are mixed with the raw material ceramic powder of the $Al_2O_3$ system to prepare the material for the formed body, the pressing or fabrication pressure is set preferably within a range of from 0.5 to 2 t/cm². In case of using the injection molding, the raw material and the hollow particle are previously kneaded together with a resinous binder to prepare a compound; and then the compound is injected from an injection machine into a metallic mold thereby obtaining a molded or formed body.

In case that the formed body contains inorganic binder(s) or organic binder(s) such as resinous binder, it is preferable to add a binder removing step before carrying out the sintering step, in order to remove the binder(s). In the binder removing step, the formed body is heated for a predetermined time at a temperature lower than a sintering temperature (the heating temperature in the sintering step) in atmospheric air, in a vacuum atmosphere or in other suitable atmospheres thereby evaporating, decomposing or burning the binder(s) or the like. In this binder removing step, a maintained heating temperature and a heating rate are suitably regulated in order to prevent the formed body from being damaged owing to abrupt occurrence of the evaporation, decomposition or the like of the binder(s) or the like.

In the sintering step, heating the formed body is carried out in a variety of atmospheres such as atmospheric air, a vacuum atmosphere, a nitrogen gas atmosphere, a vacuum atmosphere containing oxygen. Kind of the atmosphere and the sintering temperature are suitably set in accordance with kind of the raw material ceramic powder to be used, taking account of preventing the volume percentage of the pores formed in the sintered body from being excessively lowered upon contraction of the pores under the sintering having sufficiently proceeded. For example, in case of using the raw material ceramic powder of the $Al_2O_3$ system, the sintering of the formed body is carried out in atmospheric air or in the vacuum atmosphere containing oxygen preferably at a temperature ranging from 1400° to 1700° C., more preferably at a temperature ranging from 1550° to 1650° C. A predetermined amount of sintering assistant(s) may be added to the raw material ceramic powder. The sintering assistant(s) is $SiO_2$, MgO, CaO and/or the like in case of using the raw material ceramic powder of the $Al_2O_3$ system. Under the effect of the sintering assistant(s), mass transfer such as formation of liquid phase and diffusion during the sintering is promoted thereby to increase the density and therefore the strength of the sintered body. A sintering furnace used in the sintering step may be provided with a preliminary heating room in addition to a sintering room for the sintering, in which the binder removing step is carried out in this preliminary heating room.

The thus obtained sintered body or porous ceramic material can be used for a variety of slidable members or units such as slidable component parts, in a state as it is or upon being subjected to machining such as cutting and/or grinding.

An embodiment of such slidable members is a valve unit comprises (a) a liquid supply-side member including at least one liquid supply section through which liquid is supplied into the valve unit, and having a first sliding surface; (b) a flow amount control member having a second sliding surface which is in slidable contact with the first sliding surface of the supply-side member, the flow amount control member being relatively rotatable to the liquid supply-side member so as to control an amount of the liquid to be supplied from the supply-side member; and (c) a liquid discharge section through which the liquid controlled in the amount is to be discharged from the valve unit, the liquid discharge section being formed at least one of the supply-side member and the flow amount control member.

In the above valve unit, the at least one liquid supply section includes a high temperature liquid supply section through which a high temperature liquid is supplied, and a low temperature liquid supply section through which a low temperature liquid is supplied, the low temperature liquid being lower in temperature than the high temperature liquid. Additionally, the flow amount-control member has a mixing chamber in which the high and low temperature liquids are mixable with each other, the mixing chamber being communicable with the high and low temperature liquid supply section and controllable relative to the high and low temperature liquid supply sections in accordance with a relative rotation of the flow amount control member to the supply-side member.

The above valve unit formed of the porous ceramic material of the present invention is usable, for example, for a faucet for hot water, or a combination faucet for hot water and cool water. Additionally, the valve unit is excellent in sliding characteristics and high in durability under thermal shock and thermal stress due to contact between hot water and cool water thereby being prolonged in life.

EXPERIMENT

The following experiments are discussed merely to aid the understanding of the present invention, with reference to FIGS. 1 to 7B of the drawings.

First, sintering assistant(s) containing $SiO_2$, MgO, CaO and the like was added to $Al_2O_3$ powder having an average particle size of about 1 μm, in an amount of 10% by weight relative to the $Al_2O_3$ powder. A predetermined amount of binder was added to the mixture of the $Al_2O_3$ powder and the sintering assistant(s), and mixed in the wet method thereby forming a binder-containing mixture. The binder-containing mixture was subjected to spray drying thereby obtaining granulated $Al_2O_3$ powder. To this granulated powder, 5% by volume of hollow particles (under the trade made of "SHO BALLOON" of Showa Denko Co., Ltd.) was added and mixed in a dry method. The hollow particles are generally spherical and had an average particle size of 100 μm and of the $SiO_2$-$Al_2O_3$ system. The mixture of the granulated powder and the hollow particles was formed or fabricated at a pressure of 1.2 t/cm² by using a metallic mold press thereby to obtain the formed or molded body. The formed body is fired or sintered at 1580° C. for 2 hours in atmospheric air thus obtaining a ring-shaped test piece having an outer diameter 30 mm, an inner diameter of 10 mm and a thickness or height of 6 mm. This test piece was identified as that of a first sample (corresponding to Example 1)

Additionally, a test piece of a second sample (corresponding to Example 2) having the same dimensions as those of the first sample was produced in the similar manner as that of the first sample with the exception that the hollow particles of the $SiO_2$ system was used in place of the hollow particles of the $SiO_2$-$Al_2O_3$ system (the former hollow particles had the generally same particle size as that of the latter hollow particles). Further, for the comparison purpose, test pieces of third, fourth, fifth and sixth samples (corresponding to Comparative Examples 1, 2, 3 and 4, respectively) having the same shape and dimensions as those of the sample were produced in the similar manner as that of the first sample except for the followings: In production of the test piece of the third sample (Comparative Example 1), epoxy resin particles having an average particle size of 100 μm were used in place of the hollow particles; In production of the test piece of the fourth sample (Comparative Example 2), acrylic resin particles having an average particle size of 100 μm were used in place of the hollow particles; In production of the test piece of the fifth sample (Comparative Example 3), phenolic resin particles having an average particle size of 100 μm was used in place of the hollow particles; and In production of the test piece of the sixth sample (Comparative Example 4), no hollow particle was added and therefore no pore was formed in the test piece.

Figure 1:
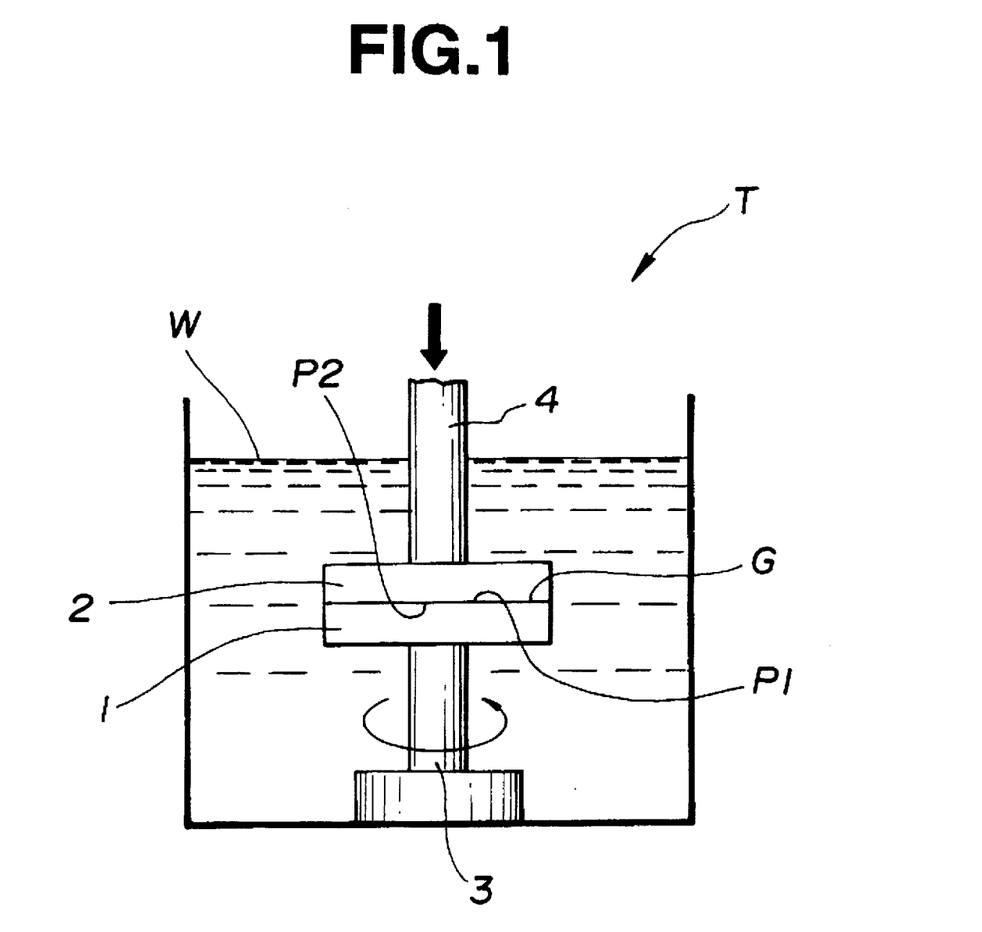
FIG. 1 is a schematic illustration of a sliding characteristics testing machine used for testing of test pieces of a variety of samples including one according to the present invention.

Two test pieces were prepared for each of the first to sixth samples. The prepared test pieces were subjected to a sliding characteristics test to measure a sliding characteristics of each test piece by using a sliding characteristics testing machine T as shown in FIG. 1. The sliding characteristics test was conducted as set forth below. First, grease G was applied to an upper surface P1 of a lower-side test piece 1 and to a lower surface P2 of an upper-side test piece 2. The lower-side and upper-side test pieces 1, 2 were located one upon another in a manner that the grease-applied surfaces P1, P2 of them were in contact with each other. The lower-side test piece 1 was fixed on a rotatable drive shaft 3, while the upper-side test piece 2 was fixed to a rotatable pressing shaft 4. Subsequently, a whole unit including the test pieces 1, 2 and the shafts 3, 4 was dipped in pure water W having a temperature of 20° C., in which a load of 50 kgf was applied through the pressing shaft 4 so as to press the upper-side test piece 2 onto the lower-side test piece 1. Under this state, the lower-side test piece 1 was driven or rotated at a rotational speed of 400 r.p.m. by the rotating shaft 3. Here, when the sliding characteristics between the upper-side test piece 2 and the lower-side test piece 1 was lowered so as to initiate to rotate together as a one-piece, the torque applied to the pressing shaft abruptly increased. This abruptly increased torque was detected by a torque measuring device (not shown). Simultaneously, measurement was made on a time duration (sliding-durability time) t from a time point of starting of rotation of the rotating shaft 3 to a time point of detecting the above abruptly increased torque. The sliding characteristics of the test pieces of each sample was evaluated with the sliding-durability time t. Result of measurement of the sliding-durability time t (min.) is shown in Table 1.

Next, earn test piece was heated and maintained at a predetermined temperature for 40 minutes, and immediately thereafter it was put into water having a temperature of 20° C., upon which production of crack in the test piece was confirmed under a visual observation. This operation was repeatedly carried out upon changing the heating temperature (or the above predetermined temperature), thereby measuring the highest value T of the heating temperature at which crack cannot be produced. Accordingly, the thermal shock resistance temperature ΔT of each test piece was obtained by subtracting the temperature T0 of the water from the heating temperature T. The rate (%) of the thermal shock resistance temperature ΔT of each test piece of the first to fifth samples relative to that of the test piece of the sixth sample (formed with no pore) was calculated.

The results of measurements of the thermal shock resistance temperature ΔT and the rate (%) of ΔT of the first to fifth samples relative to that of the sixth sample are shown in Table 1.

TABLE 1

| Sample (Test piece) | | | Thermal shock resistance temp. ΔT (°C.) | Rate (%) of ΔT relative to 6th sample | Sliding-durability time t (min) |
|---|---|---|---|---|---|
| 1st | Example | 1 | 170 | 85 | 300 |
| 2nd | | 2 | 180 | 90 | 300 |
| 3rd | Com- | 1 | 140 | 70 | 250 |
| 4th | parative | 2 | 130 | 65 | 300 |
| 5th | example | 3 | 150 | 75 | 150 |
| 6th | | 4 | 200 | — | 100 |

According to the test results in Table 1, the sliding-durability time t of each test piece of all the first to fifth samples (formed with the pores) is longer than that of the sixth sample (formed with no pore). Additionally, each test piece of the first and second samples (according to the present invention) exhibits a thermal shock resistance temperature ΔT which is over 80% relative to that ΔT of the test piece of the sixth sample (formed with no pore). In contrast, each test piece of the third to fifth samples (the resin particles were used as the pore-forming medium) exhibits a thermal shock resistance temperature ΔT which is below 80% relative to that ΔT of the test piece of the sixth sample. Accordingly, it will be appreciated that the porous ceramic material of the present invention is not only excellent in the sliding characteristics but also high in thermal shock resistance.

Thereafter, polishing was made for the surface of each test piece of the first and second samples (using the hollow particles of the $SiO_2$-$Al_2O_3$ system and the $SiO_2$ system, respectively) according to the present invention and for the surface of the test piece of the fifth sample (using the phenolic resin particles) thereby exposing the polished surface of each test piece. The structure of the polished surface was observed by a scanning electron microscope (SEM). Additionally, regarding the test pieces of the second and fifth samples, a composition analysis for an inner surface portion of one of the pores and a part other than the pores was conducted by using an energy dispersive X-ray analysis (EDS) provided to the scanning electron microscope. The term "inner surface portion" means a portion including a surface defining each pore.

Figure 2:
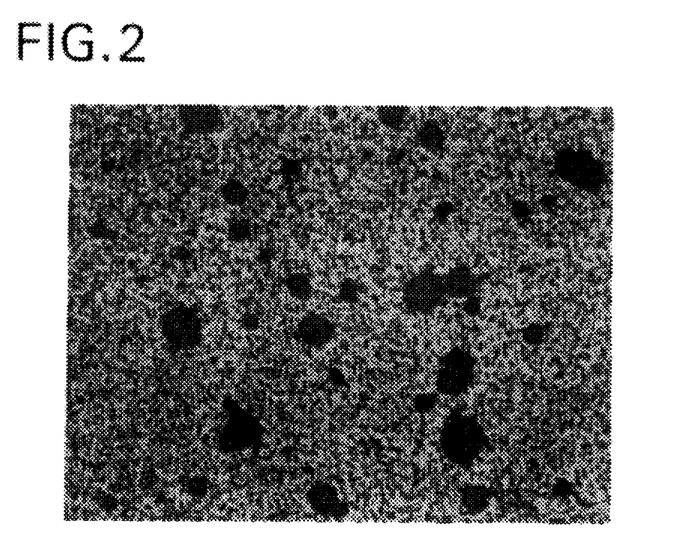
FIG. 2 is a scanning electron microscope (SEM) photograph of a surface of the test piece of a first sample (ceramic material) according to the present invention.
Figure 3:
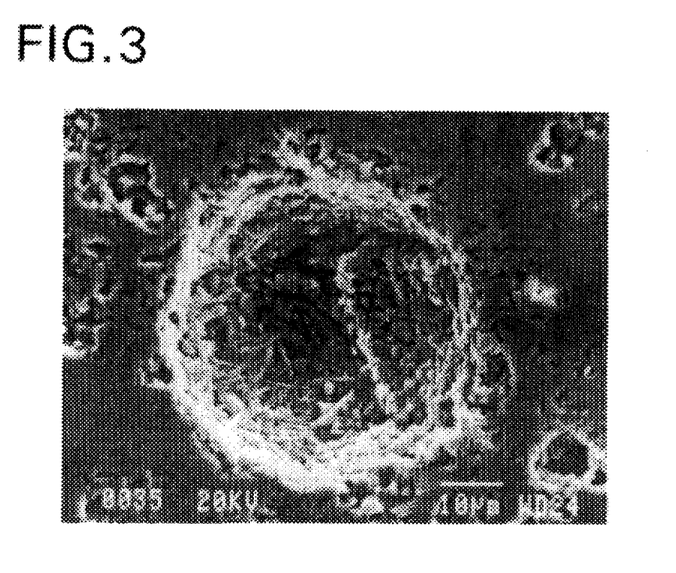
FIG. 3 is an enlarged SEM photograph of a part of the surface of the test piece of the first sample.
Figure 4:
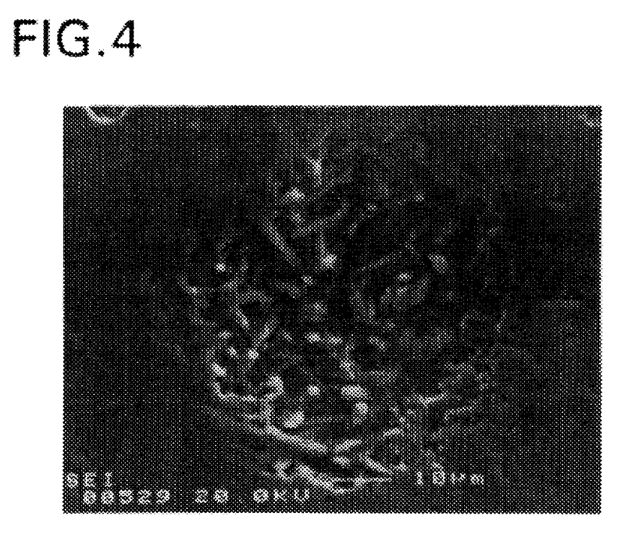
FIG. 4 is an enlarged SEM photograph of a part of the surface of the test piece of the second sample (ceramic material) according to the present invention.
Figure 5A:
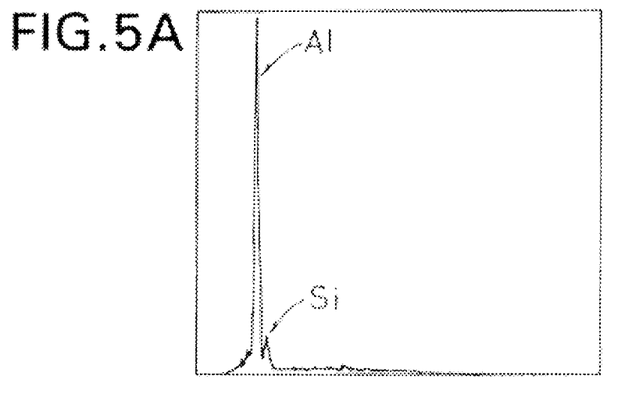
FIG. 5A is a graph showing a spectrum of an energy dispersive X-ray analysis of a part other than pores in the test piece of the second sample.
Figure 5B:
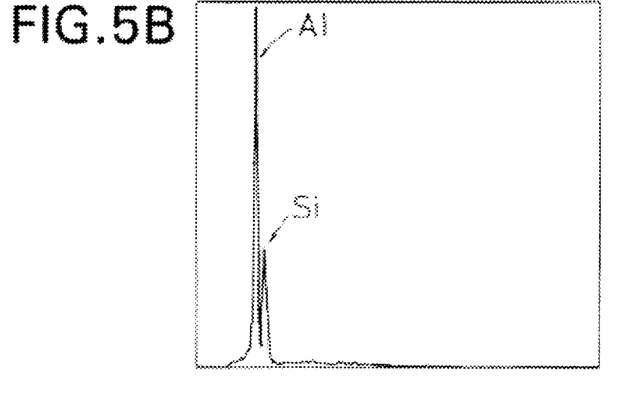
FIG. 5B is a graph showing a spectrum of the energy dispersive X-ray analysis of an inner surface portion of one of the pores in the test piece of the second sample.

FIG. 2 is a SEM photograph (at 30 magnifications) of the surface of the test piece of the first sample, in which it was observed that many pores (large dark spots in the photograph) are formed in the ceramic sintered body. FIG. 3 is an enlarged SEM photograph (at 1000 magnifications) of a portion around one of the pores. This photograph shows that columnar matters are formed together with component particles of the ceramic sintered body. FIG. 4 is an enlarged SEM photograph (at 1000 magnifications) of a portion around one of pores in the test-piece of the second sample, and shows that a large amount of columnar matters are formed at the surface portion of the pore. FIGS. 5A and 5B show EDS spectrums of the part other than the pores and the surface of the inner surface portion of the pore, respectively. These figures depict that the peak of Al is predominant so that the peak of Si is very low in the portion other than the pores, while a large peak of Si appears at the inner surface portion of the pore.

Figure 6:
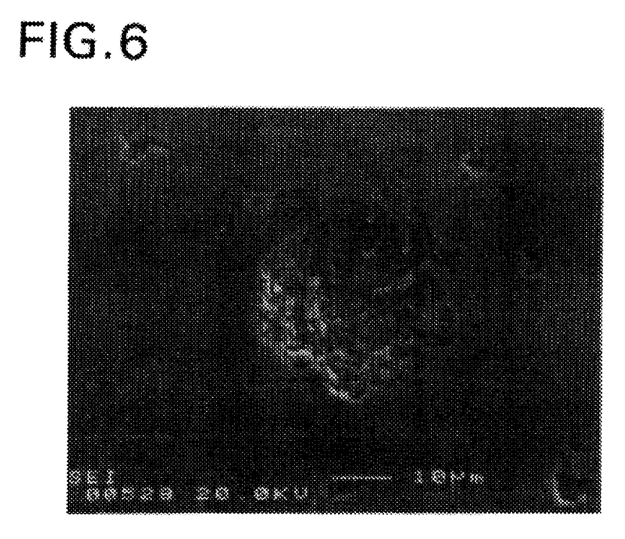
FIG. 6 is an enlarged SEM photograph of a part of the surface of the test piece of the fifth sample.
Figure 7A:
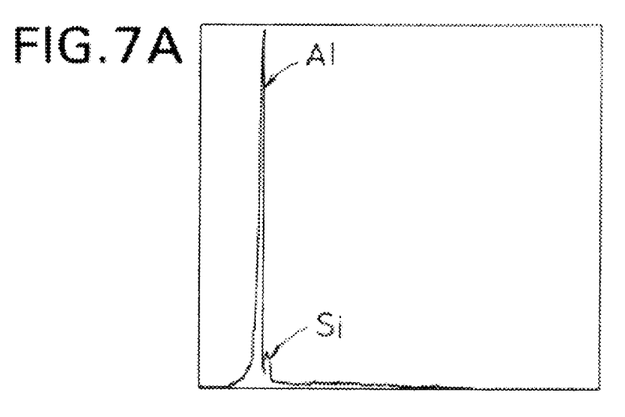
FIG. 7A is a graph showing a spectrum of an energy dispersive X-ray analysis of a part other than pores in the test piece of the fifth sample.
Figure 7B:
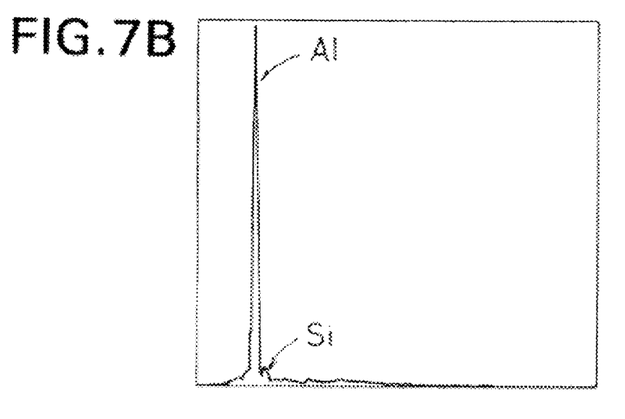
FIG. 7B is a graph showing a spectrum of the energy dispersive X-ray analysis of the inner surface portion of one of the pores in the test piece of the fifth sample.

FIG. 6 is an enlarged SEM photograph (at 1000 magnifications) of a portion around one of pores of the test piece of the fifth sample, in which no formation of columnar matters is shown. FIGS. 7A and 7B show EDS spectrums of a part other than the pores and the inner surface portion of the pore, respectively. These figures depict that the peak of Si is low both at the inner surface portion of the pore and in the part other than the pores.

It is supposed that the above columnar matters appeared at the inner surface portion of the pore constitute the surface layer (for each pore) high in Si content, as shown in FIGS. 3 and 4.

EMBODIMENT

Hereinafter, a concrete example of the above-mentioned embodiment of the slidable member or unit will be discussed with reference to FIGS. 8 to 10.

Figure 8:
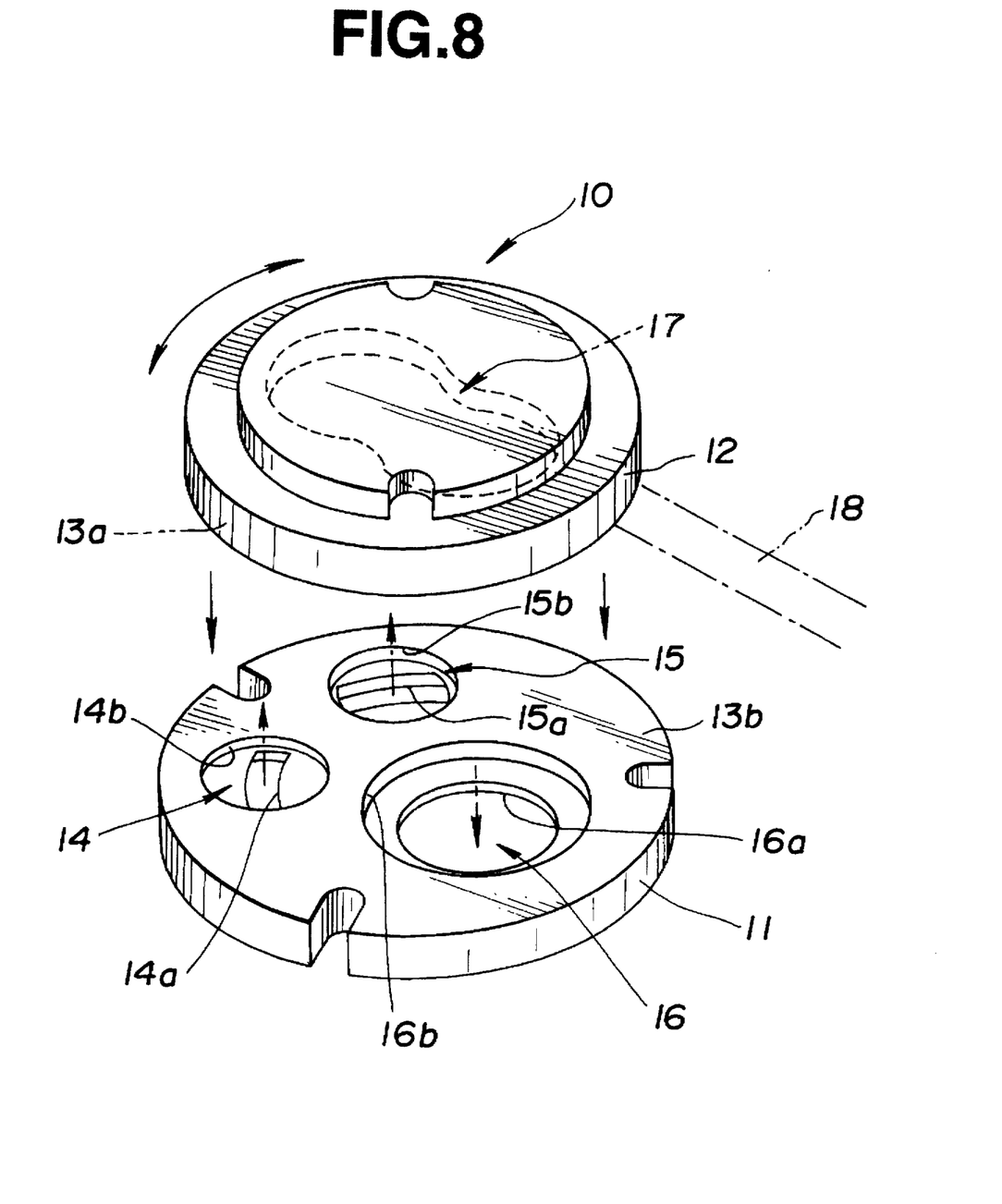
FIG. 8 is an exploded perspective view of an essential part of a valve unit as an embodiment of a slidable member of the present invention.
Figure 9:
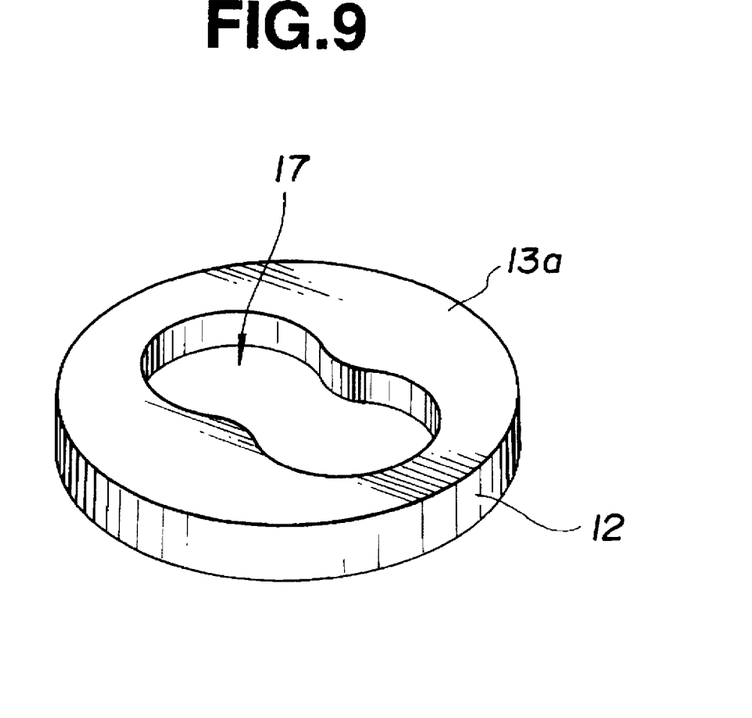
FIG. 9 is a perspective view of a flow amount control member forming part of the valve unit of FIG. 8, showing the back side of the control member.
Figure 10:
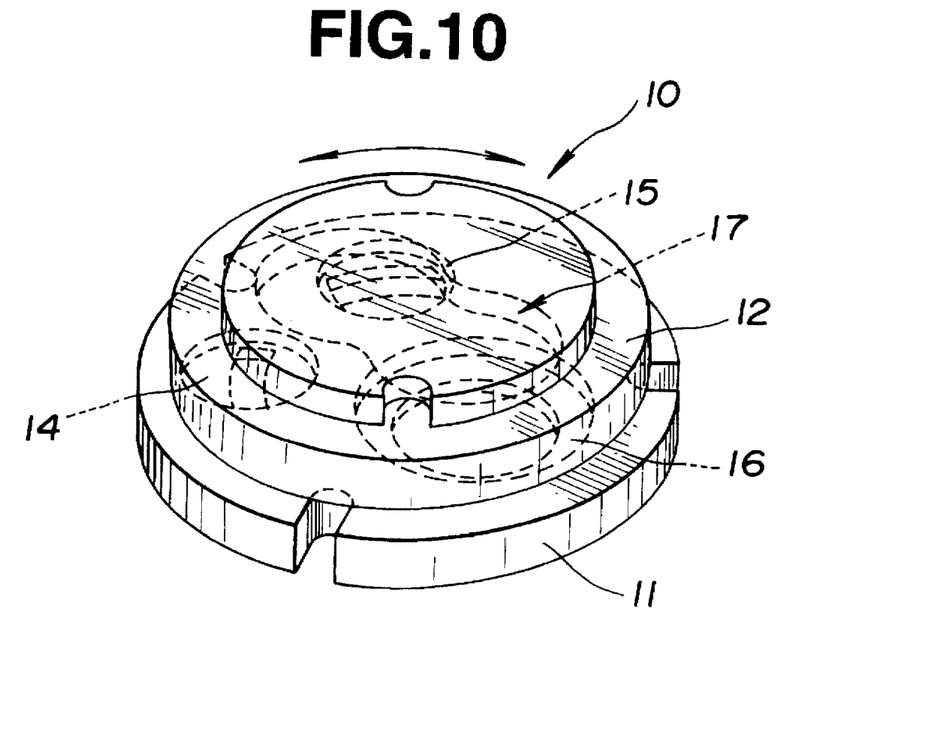
FIG. 10 is a perspective view of the essential part of the valve unit of FIG. 8, in an assembled state.

Referring to FIGS. 8 to 10, a valve unit as an example of the slidable member or unit is illustrated by a reference numeral 10. The valve unit 10 is used, for example, as a valve section of a combination faucet for mixing liquids (such as hot water and cool water) which are different in temperature. The valve unit 10 comprises a supply-side member 11, and a flow amount control member 12. Each member 11, 12 is formed generally disc-shaped as shown, or may be otherwise formed plate-shaped. The flow amount control member 12 is formed at its lower face with a sliding surface 13a. The supply-side member 11 is formed at its upper face with a sliding surface 13b. The flow amount control member 12 and the supply-side member 11 are put one upon another in such a manner that the sliding surfaces 13a, 13b are in slidable contact with each other. The flow amount control member 12 and the supply-side member 11 are both formed of the porous ceramic material according to the present invention, and disposed within a casing (not shown) to which inflow and outflow pipes and like are connected.

The supply-side member 11 is provided with high and low temperature liquid supply sections 14, 15 which pierce the member 11 in a direction of thickness of the member 11. The high temperature liquid supply section 14 includes a high temperature liquid inflow opening 14a which is formed through the lower face of the supply-side member 11, and a high temperature liquid outflow opening 14b formed through the sliding surface 13b of the supply-side member 11. Similarly, the low temperature liquid supply section 15 includes a high temperature liquid inflow opening 15a which is formed through the lower face of the supply-side member 11, and a high temperature liquid outflow opening 15b formed through the sliding surface 13b of the supply-side member 11. High temperature liquid (such as hot water) is introduced from an inflow pipe (not shown) through the opening 14a to the opening 14b, while low temperature liquid (such as cool water) is introduced from another inflow pipe (not shown) through the opening 15a to the opening 15b. The liquids from the liquid outflow openings 14b, 15b are flown into the flow amount control member 12. Additionally, the supply-side member 11 is provided with a liquid discharge section 16 which pierces the member 11 in a direction of thickness of the member 11. The liquid discharge section 16 includes a liquid inflow opening 16b formed through the sliding surface 13b of the supply-side member 11, and a liquid outflow opening 16a formed through the lower face of the supply-side member 11. Accordingly, the liquid from the flow amount control member 12 is flown back to the side of the supply-side member 11 and introduced through the opening 16b to the opening 16a. The liquid from the opening 16a is discharged through the outflow pipe connected to the casing.

The flow amount control member 12 is formed with a mixing chamber 17 opened to the sliding surface 13a as also shown in FIG. 9. The mixing chamber 17 overlaps with and is in communication with the high and low temperature liquid supply sections 14, 15 and the liquid discharge section 16, so that high temperature liquid from the high temperature liquid supply section 14 and the low temperature liquid from the low temperature liquid supply section 15 are mixed and discharged through the liquid discharge section 16. Here, as shown in FIG. 10, the flow amount control member 12 is relatively rotatable to the supply-side member 11 so that a ratio between the high and low temperature liquids (respectively from the high and low temperature liquid supply sections 14, 15) supplied to the mixing chamber 17 is changed in accordance with the relative rotation between the flow amount control member 12 and the supply-side member 11, i.e., in accordance with a ratio in area between the low and high temperature liquid supply section 14, 15 overlapped with the mixing chamber 17 of the flow amount control member 12.

In operation, as shown in FIG. 8, when the flow amount control valve 12 is rotated to the side of the high temperature liquid supply section 14 under the action of a lever 18 or the like, the overlapped area between the liquid outflow opening 14b and the mixing chamber 17 increases relative to that between the liquid outflow opening 15b and the mixing chamber 17, increasing the ratio of the high temperature liquid flowing into the mixing chamber 17 relative to the low temperature liquid flowing into the mixing chamber 17. As a result, the temperature of a mixed liquid discharged through the liquid discharge section 16 rises. Conversely, when the flow amount control valve 12 is rotated to the side of the low temperature supply section 15, the ratio of the low temperature liquid relative to the high temperature liquid increases, and therefore the temperature of the mixed liquid discharged through the liquid discharge section 16 lowers. Thus, by regulating the rotational angle of the flow amount control member 12, the temperature of the mixed liquid to be discharged through the liquid discharge section 16 can be freely changed. The liquid discharge section 16 may be formed on the side of the flow amount control member 12.

The above supply-side member 11 and the flow amount control member 12 of the valve unit 10 are formed of the porous ceramic material of the present invention, and therefore they are sufficiently high in durability under thermal shock and thermal stress while maintaining a good sliding characteristics between the members 11, 12 even upon a long time use.

While only the valve unit of the combination faucet has been shown and described in detail as an embodiment formed of the porous ceramic material of the present invention, it will be appreciated that the porous ceramic material of the present invention may be used not only for other valves such as a valve adapted to simply stop and allow liquid flow or a valve adapted to control the flow amount of liquid, but also for a slidable member or unit other than valves, for example, a mechanical seal or a slidable member to be used under the existence of lubricant.

What is claimed is:

1. A porous ceramic material comprising:
   a ceramic sintered body having a sliding surface which is formed with pores dispersedly located in said sintered body and exposed to the sliding surface, said pores being defined respectively by surface layers forming part of said ceramic sintered body, wherein particles of said ceramic sintered body are comprised of at least one material selected from the group consisting of $Al_2O_3$ system powder, $Si_3N_4$ system powder, SiC system powder, AlN system powder and $ZrO_2$ system powder; and silicon contained in said ceramic sintered body, a content of silicon being higher in at least a part of said surface layers than that in other parts of said ceramic sintered body, and wherein a lubricant is present at least in pores exposed to the sliding surface.

2. A porous ceramic material as claimed in claim 1, wherein an average size of each pore is larger than that of each of main component particles of said ceramic sintered body.

3. A porous ceramic material as claimed in claim 2, wherein said average size of each pore is within a range of from 5 to 300 μm.

4. A porous ceramic material as claimed in claim 1, wherein a total volume of said pores is within a range of from 2 to 40% of a volume of said ceramic sintered body.

5. A porous ceramic material comprising:

a ceramic sintered body having a sliding surface which is formed with pores dispersedly located in said sintered body and exposed to the sliding surface, said pores being defined respectively by surface layers forming part of said ceramic sintered body, wherein particles of said ceramic sintered body are comprised of at least one material selected from the group consisting of $Al_2O_3$ system powder, $Si_3N_4$ system powder, SiC system powder, AlN system powder and $ZrO_2$ system powder;

silicon contained in said ceramic sintered body, a content of silicon being higher in at least a part of said surface layers than that in other parts of said ceramic sintered body; and a lubricant supplied at least in pores exposed to the sliding surface;

said porous ceramic material being produced by a method including the following steps in the sequence set forth:

mixing ceramic powder and hollow particles which contain silicon so as to obtain a mixture;

forming said mixture into a predetermined shape to obtain a formed body; and sintering said formed body at a temperature higher than a melting point of each hollow particle to obtain said ceramic sintered body formed with pores and containing silicon.

6. A slidable member formed of a porous ceramic material including a ceramic sintered body which is formed with pores dispersedly located in said sintered body, said pores being defined respectively by surface layers forming part of said ceramic sintered body, wherein particles of said ceramic sintered body are comprised of at least one material selected from the group consisting of $Al_2O_3$ system powder, $Si_3N_4$ system powder, SiC system powder, AlN system powder and $ZrO_2$ system powder, and silicon contained in said ceramic sintered body, a content of silicon being higher in at least a part of said surface layers than that in other parts of said ceramic body, said slidable member comprising:

a main body; and means defining a sliding surface at a part of said main body, said sliding surface being in slidable contact with a member independent from said main body, wherein a lubricant is supplied at least in pores exposed to the sliding surface.

* * * * *